(12) United States Patent
Doyle et al.

(10) Patent No.: US 7,912,957 B2
(45) Date of Patent: Mar. 22, 2011

(54) AUTONOMIC SERVICE ROUTING USING OBSERVED RESOURCE REQUIREMENT FOR SELF-OPTIMIZATION

(75) Inventors: Ronald P. Doyle, Raleigh, NC (US); David Louis Kaminsky, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 12/269,376

(22) Filed: Nov. 12, 2008

(65) Prior Publication Data

US 2009/0100192 A1 Apr. 16, 2009

Related U.S. Application Data

(62) Division of application No. 10/370,837, filed on Feb. 21, 2003, now Pat. No. 7,461,166.

(51) Int. Cl.
*G06F 15/173* (2006.01)

(52) U.S. Cl. ...................................... 709/226; 709/238
(58) Field of Classification Search ........... 709/223–241
See application file for complete search history.

(56) References Cited

FOREIGN PATENT DOCUMENTS

| JP | 11-032081 | 2/1999 |
| JP | 2000-112909 | 4/2000 |
| JP | 2002-202893 A | 7/2002 |
| JP | 2002-318791 | 10/2002 |
| JP | 2002-342297 A | 11/2002 |

*Primary Examiner* — Salad Abdullahi
(74) *Attorney, Agent, or Firm* — Scott D. Paul, Esq.

(57) ABSTRACT

A service request routing system and method includes a model table configured to store resource models. A monitor is coupled to the model table and programmed both to model resource consumption in a service providing infrastructure, and also to store the modeled resource consumption in the model table. A router is coupled to the model table, and the router is programmed to route each service request to a corresponding service instance disposed in an associated service host having a service providing infrastructure. The associated service host includes a grid host in a grid computing system.

5 Claims, 2 Drawing Sheets

Figure 1:
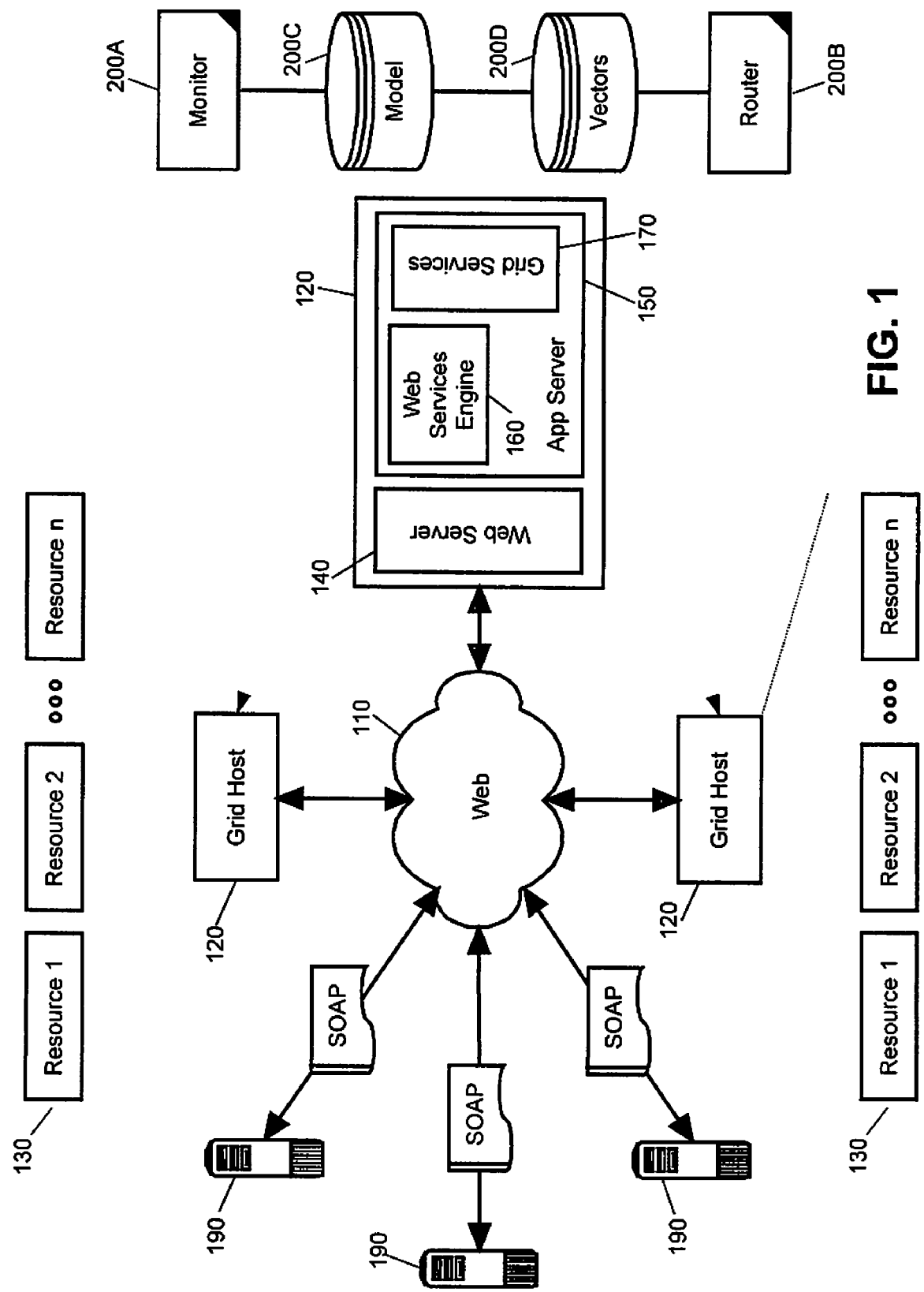

AUTONOMIC SERVICE ROUTING USING OBSERVED RESOURCE REQUIREMENT FOR SELF-OPTIMIZATION

CROSS-REFERENCE TO RELATED APPLICATIONS

This application is a Divisional of U.S. application Ser. No. 10/370,837, filed Feb. 21, 2003, entitled "AUTONOMIC SERVICE ROUTING USING OBSERVED RESOURCE REQUIREMENT FOR SELF-OPTIMIZATION," which is incorporated herein by reference in its entirety.

BACKGROUND OF THE INVENTION

1. Field of the Invention

The present invention relates to the field of distributed computing, including Web services and grid services, and more particularly to the routing of a service request to a service instance within a service providing infrastructure.

2. Description of the Related Art

Web services represent the leading edge of distributed computing and are viewed as the foundation for developing a truly universal model for supporting the rapid development of component-based applications over the World Wide Web. Web services are known in the art to include a stack of emerging standards that describe a service-oriented, component-based application architecture. Specifically, Web services are loosely coupled, reusable software components that semantically encapsulate discrete functionality and are distributed and programmatically accessible over standard Internet protocols.

Conceptually, Web services represent a model in which discrete tasks within processes are distributed widely throughout a value net. Notably, many industry experts consider the service-oriented Web services initiative to be the next evolutionary phase of the Internet. Typically, Web services can be defined by an interface such as the Web services definition language (WSDL), and can be implemented according to the interface, though the implementation details matter little so long as the implementation conforms to the Web services interface. Once a Web service has been implemented according to a corresponding interface, the implementation can be registered with a Web services registry, such as Universal Description, Discover and Integration (UDDI), as is well known in the art. Upon registration, the Web service can be accessed by a service requester through the use of any supporting messaging protocol, including for example, the simple object access protocol (SOAP).

In a service-oriented application environment supporting Web services, locating reliable services and integrating those reliable services dynamically in realtime to meet the objectives of an application has proven problematic. While registries, directories and discovery protocols provide a base structure for implementing service detection and service-to-service interconnection logic, registries, directories and discovery protocols alone are not suitable for distributed interoperability. Rather, a more structured, formalized mechanism can be necessary to facilitate the distribution of Web services in the formation of a unified application.

Notably, the physiology of a grid mechanism through the Open Grid Services Architecture (OGSA) can provide protocols both in discovery and also in binding of Web services, hereinafter referred to as "grid services", across distributed systems in a manner which would otherwise not be possible through the exclusive use of registries, directories and discovery protocols. As described both in Ian Foster, Carl Kesselman, and Steven Tuecke, The Anatomy of the Grid, Intl J. Supercomputer Applications (2001), and also in Ian Foster, Carl Kesselman, Jeffrey M. Nick and Steven Tuecke, The Physiology of the Grid, Globus.org (Jun. 22, 2002), a grid mechanism can provide distributed computing infrastructure through which grid services instances can be created, named and discovered by requesting clients.

Grid services extend mere Web services by providing enhanced resource sharing and scheduling support, support for long-lived state commonly required by sophisticated distributed applications, as well as support for inter-enterprise collaborations. Moreover, while Web services alone address discovery and invocation of persistent services, grid services support transient service instances which can be created and destroyed dynamically. Notable benefits of using grid services can include a reduced cost of ownership of information technology due to the more efficient utilization of computing resources, and an improvement in the ease of integrating various computing components. Thus, the grid mechanism, and in particular, a grid mechanism which conforms to the OGSA, can implement a service-oriented architecture through which a basis for distributed system integration can be provided-even across organizational domains.

Within the computing grid, a service providing infrastructure can provide processing resources for hosting the execution of distributed services such as grid services. The service providing infrastructure can include a set of resources, including server computing devices, storage systems, including direct attached storage, network attached storage and storage area networks, processing and communications bandwidth, and the like. Individual transactions processed within the service providing infrastructure can consume a different mix of these resources.

It is known in the grid services context to route requests to particular service instances hosted within a specified service providing infrastructure according to the queue length of the particular service instance. The logical selection of a particular service instance based upon a queue lengths represents an attempt to minimize response time by placing requests for service processing in the shortest possible queue. Similarly, the processing capabilities of the hosting service providing infrastructure further can be taken into account in selecting a particular service instance.

More particularly, a particular service instance able to process requests at twice the rate of other service instances can have equal processing throughput as the other service instances where the particular service instance has a queue which is twice as long as the queue of the other service instances. Still, the queue length selection strategy can be overly coarse-grained and does not match the resource requirements of a requested service to the available resources of the service providing infrastructure. Specifically, in the conventional circumstance, a mere scalar benchmark can be associated with the whole of a service providing infrastructure. Consequently, the granular components of the service providing infrastructure are never taken into account.

BRIEF SUMMARY OF THE INVENTION

The present invention is a service request routing system and method. In accordance with the present invention, individual service requests can be routed to service instances within selected service hosts having resource components most compatible with the resource requirements and consumption patterns of the service requests. In this way, unlike the conventional circumstance in which a mere scalar benchmark can be associated with the whole of a service providing infrastructure, the granular components of the service providing infrastructure of the grid host can be taken into account when routing service requests to service instances.

A service request routing system can include a model table configured to store resource models. A monitor can be coupled to the model table and programmed both to model resource consumption in a service providing infrastructure, and also to store the modeled resource consumption in the model table. A router also can be coupled to the model table. Specifically, the router can be programmed to route each service request to a corresponding service instance disposed in an associated service host having a service providing infrastructure. In a preferred aspect of the invention, the associated service host can include a grid host in a grid computing system.

Importantly, the routing can be based upon a matching of resource components of the service providing infrastructure to a resource model for the service request. Additionally, in the preferred aspect, each resource model in the model table can be a time series model. Finally, the resource components can form a resource vector corresponding to the service providing infrastructure. In this regard, each resource component in the resource vector can include a resource selected from the group consisting of a server type, bandwidth, and storage system type. Other resources can include more granular computing resources, for instance cache size or CPU speed. Furthermore, a comparator further can be included which can be programmed to compare a scalar cost of each resource vector to determine a relative cost between individual resource vectors.

A method for routing service requests to service instances in a service providing infrastructure can include receiving a service request and computing resource vectors for at least two service hosts. Each service host can have a corresponding service providing infrastructure. A resource model can be retrieved for the service request. Accordingly, the retrieved resource model can be matched to each of the resource vectors to identify a best-fit resource vector. Finally, the service request can be routed to a selected service host associated with the identified best-fit resource vector.

In a preferred aspect of the invention, for each of the resource vectors at least two scalar resource components can be computed. In this regard, the scalar components can include server type, server performance, server capacity, processing bandwidth, communications bandwidth, storage type, storage capacity and storage performance. Also, a scalar cost can be computed for each of the resource vectors. In this way, the scalar costs can be compared to determine a more cost-effective resource vector.

To produce the resource models, processing of received service requests can be monitored and individual resource components can be identified in the service hosts which are consumed during the processing. Consequently, the resource models can be produced for the service requests based upon the identified individual resource components in the service hosts. Notably, the producing step can include the step of computing a time series model for each of the service requests based upon the identified individual resource components.

BRIEF DESCRIPTION OF THE SEVERAL
VIEWS OF THE DRAWINGS

Figure 2:
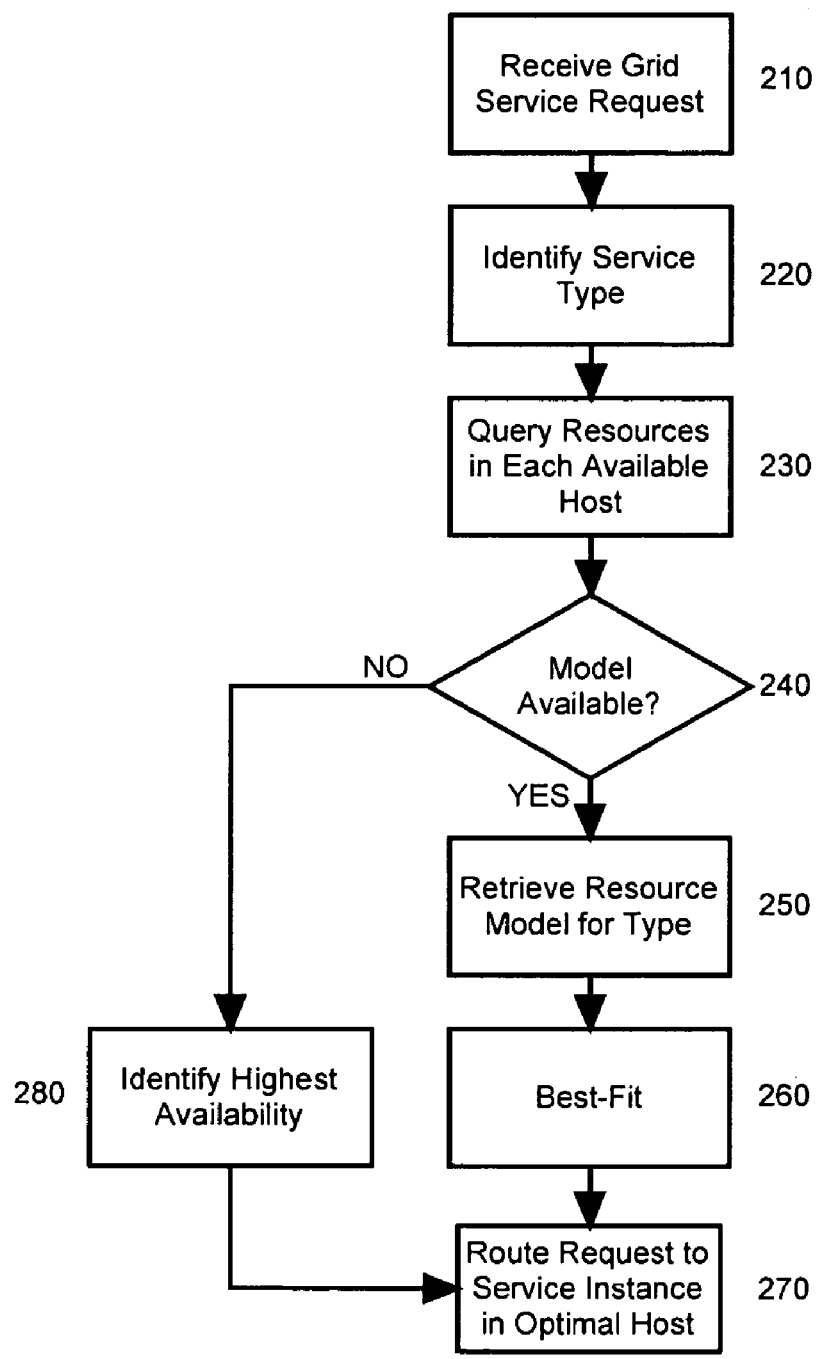

There are shown in the drawings embodiments which are presently preferred, it being understood, however, that the invention is not limited to the precise arrangements and instrumentalities shown, wherein:

FIG. 1 is a block illustration of a services grid configured for routing service requests to service hosts within a service providing infrastructure having resources which best match the resource requirements of the requested service in accordance with the present invention; and, FIG. 2 is a flow chart illustrating a process for routing service requests to service hosts within a service providing infrastructure having resources which best match the resource requirements of the requested service in the grid of FIG. 1.

DETAILED DESCRIPTION OF THE INVENTION

The present invention is a method and system for routing service requests to service instances in selected service providing infrastructure. Specifically, the granular resource requirements of a service can be matched to the granular resources within a resource set associated with a service providing infrastructure hosting an instance of the requested service. Based upon a best-fit matching of resource requirements of the requested service to resource availability of a host service providing infrastructure, the request for service processing can be assigned to a service instance hosted within the matched service providing infrastructure. In this way, the mere routing of service requests based upon a course-grained, scalar evaluation of a service providing infrastructure can be avoided.

FIG. 1 is a block illustration of a services grid configured for routing service requests to service instances hosted within a service providing infrastructure having resources which best match the resource requirements of the requested service in accordance with the present invention. As will be apparent to the skilled artisan, the services grid can be a Web services grid configured with one or more grid hosts 120 communicatively linked to one another in a grid fashion across a computer communications network 110, for instance the Internet. Individual requesting clients 190 can request access to Web services from one or more of the grid hosts 120. Specifically, as is well-known in the art, SOAP encoded messages can be exchanged between requesting clients 190 and the grid hosts 120. The messages can include requests to discover the location of particular Web services and well as responses to the requests in which the network location of the requested Web services are revealed.

The grid hosts 120 can be disposed within a server computing device in a centralized fashion, or across multiple server computing devices in a distributed fashion. In either case, a Web server 140 can be provided which can be configured to respond to network requests for content, such as markup documents. As will be understood by one of ordinary skill in the art, the Web server 140 can be configured to handle hypertext transfer protocol (HTTP) messages and to distribute markup such as hypertext markup language (HTML) formatted documents, extensible markup language (XML) formatted documents, and the like.

The Web server 140 can be communicatively linked in the grid host 120 to an application server 150. Application servers are well-known in the art and typically are configured to process machine code, whether in an interpreted manner, or in a native format. Conventional application servers process server-side logic such as scripts and servlets. In any event, the application server 150 can be linked to a Web services engine 160 configured to instantiate individual Web services in one or more Web services containers in the grid hosts 120. The Web services instances, in turn, can access the resources 130 of the grid host 120. It will be recognized by the skilled artisan that the collection of resources 130 can be considered the foundation of a service providing infrastructure. To that end, the resources 130 can include server computing devices and processes, storage systems, and communications and computing bandwidth.

Importantly, a grid service mechanism 170 can be disposed in each grid host 120. The grid service mechanism 170 can implement a grid services interface such as that defined by OGSA and specified, for example, according to the Globus Project, Globus Toolkit Futures: An Open Grid Services Architecture, Globus Tutorial, Argonne National Laboratory (Jan. 29, 2002). As is well-known in the art, an OGSA compliant grid services interface can include the following interfaces and behaviors:

1. Web service creation (Factory)
2. Global naming (Grid Service Handle) and references (Grid Service Reference)
3. Lifetime management
4. Registration and discovery
5. Authorization
6. Notification
7. Concurrency
8. Manageability In that regard, the grid services mechanism 170 can include a factory interface able to clone instances of selected Web services into new or pre-existing application containers using a "Factory Create Service".

Significantly, the grid services mechanism 170 can instantiate clone instances of a requested Web service across one or more remote grid hosts 120. In particular, consistent with the intent of grid architectures, where processing loads experienced by individual remote grid hosts 120 exceed acceptable or pre-specified capacities, others of the individual remote grid hosts 120 can be selected to host new instances of selected Web services. In any event, responsive to receiving service requests for processing in a specified Web service, regardless of any particular instance of the specified Web service, a routing process 200B can select a specific service instance within a grid host 120 to handle the service request.

Significantly, in selecting the specific service instance, the resources 130 associated with the service providing infrastructure of the grid host 120 of the specific service instance can be considered. More particularly, the resource availability of the grid host 120 can be matched to the resource requirements of the service request. To undertake the resource matching, for each transaction processed in a grid host 120, a monitor process 200A can monitor the utilization of resources 130 in the grid host 120 so as to establish a resource requirements and consumption model for the transaction. The established model for each transaction can be stored in a model table 200C.

Subsequently, the router can establish a resource vector for each grid host 120 under consideration during the routing process. The resource vector can include scalar values for the individual resources 130 forming the foundation of the service providing infrastructure of the grid host 120. Examples can include available processing bandwidth, available communications bandwidth, storage type, capacity and responsiveness, server type, etc. Each resource vector established for the service providing infrastructure of a grid host can be stored in a vector table 200D. Additionally, a cost element can be computed for the vector so that individual vectors in the vector table 200D can be compared to one another in a scalar fashion.

When a service request is received in the routing process 200B, the routing process 200B can identify the transaction type associated with the service request. Based upon the transaction type, the model for the transaction type can be retrieved from the model table 200C and matched to the resource vectors in the vector table 200D which are associated with grid hosts 120 having either available service instances able to handle the received service request, or the ability to instantiate service instances able to handle the received service request. In this regard, a best-fit algorithm can be applied to select the appropriate grid host 120 to handle the request.

FIG. 2 is a flow chart illustrating a process for routing service requests to service hosts within a service providing infrastructure having resources which best match the resource requirements of the requested service in the grid of FIG. 1. Beginning in block 210, a grid service request can be received. In block 220, the service type can be identified. In block 230, the resources of available grid hosts configured to host service instances of the requested service type can be queried to establish respective resource vectors. Additionally, in decision block 230, it can be determined if a model has been computed for the service type.

If in decision block 240 a model cannot be located for the identified service type, in block 280, the grid host configured to host service instances of the requested service type which demonstrates the highest availability in terms of queue length or scalar performance can be selected. Otherwise, in block 250, the resource model for the service type can be retrieved and in block 260, a best-fit analysis can be applied to the model and the resource vectors of the set of grid hosts able to host service instances of the requested service type. Based upon the best-fit analysis of block 260, in block 270 the service request can be routed to the service instance within the specified grid host.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

What is claimed is:
1. A service request routing system comprising:
a model table configured to store resource models;
a monitor coupled to said model table and programmed both to model resource consumption in a service provid- ing infrastructure, and also to store said modeled resource consumption in said model table; and, a router coupled to said model table and programmed to route each service request to a corresponding service instance disposed in an associated service host having a service providing infrastructure based upon a matching of resource components of said service providing infrastructure to a resource model for said service request, wherein said monitor processes said received service requests, identifies individual resource components in service hosts which are consumed during said processing, and produces resource models for said service requests based upon said identified individual resource components in said service hosts by computing a time series model for each of said service requests based upon said identified individual resource components.

2. The service request routing system of claim 1, wherein said associated service host comprises a grid host in a grid computing system.

3. The service request routing system of claim 1, wherein said resource components form a resource vector corresponding to said service providing infrastructure.

4. The service request routing system of claim 3, wherein each resource component in said resource vector comprises a resource selected from the group consisting of a server type, bandwidth, and storage system type.

5. The service request routing system of claim 3, further comprising a comparator programmed to compare a scalar cost of each resource vector to determine a relative cost between individual resource vectors.

* * * * *